United States Patent Office  3,428,669
Patented Feb. 18, 1969

3,428,669
ARYL CARBAMATES
Delta W. Gier, Parkville, and Ralph W. Pritchard II,
Kansas City, Mo., assignors to Chemagro Corporation,
New York, N.Y., a corporation of New York
No Drawing. Filed Mar. 11, 1965, Ser. No. 439,056
U.S. Cl. 260—471                                  10 Claims
Int. Cl. C07c 79/46; A01n 9/20, 5/00

ABSTRACT OF THE DISCLOSURE

The compounds are prepared having the formula:

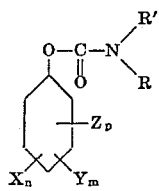

where X is chlorine, Y is nitro, Z is selected from the group consisting of methyl and hydrogen, R is selected from the group consisting of phenyl, tolyl and chlorophenyl and R' is selected from the group consisting of hydrogen, phenyl, tolyl, chlorophenyl, alkyl and cycloalkyl, where $n$ and $m$ are integers from 1 to 3 and $p$ is an integer from 0 to 3. The compounds are useful as defoliants, disiccants, fungicides and nematocides.

---

The present invention relates to novel carbamates.
It is an object of the present invention to prepare novel aromatic carbamates.
Another object is to prepare novel carbamates which are useful as pesticides.
Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.
It has now been found that these objects can be attained by preparing carbamates having the formula

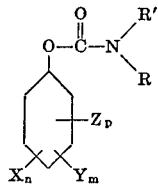

where X is chlorine, Y is nitro, Z is methyl or hydorgen, R is phenyl, tolyl or chlorophenyl, R' is hydrogen, phenyl, tolyl, chlorophenyl, alkyl or cycloalkyl, $n$ and $m$ are integers from 1 to 3 and $p$ is an integer from 0 to 3 inclusive.
The novel carbamates are useful as desiccants, e.g. to desiccate cotton, as fungicides, e.g. as soil fungicides, foliar fungcides, seed protectants and seed disinfectants and, to a lesser extent, as nematocides, e.g. as saprophytic nematocides and as defoliants.
The carbamates can be prepared in the manner taught in Lambrech Patent 2,933,383 by using aromatic amines rather than aliphatic amines. More preferably, however, those compounds where R is hydrogen are prepared in the manner set forth below.

REACTION 1

One mole of the appropriate phenol was placed in a round bottom flask equipped with a reflux condenser, 500 ml. of carbon tetrachloride was added as a solvent. One mole of the appropriate aromatic isocyanate and a catalytic quantity of pyridine (0.5 ml. of pyridine) was added and the mixture was refluxed for three hours. After standing overnight 300 ml. of hot n-hexane was added. The crude carbamate was precipitated upon cooling, collected by filtration, washed with cold n-hexane and recrystallized from hexane or benzene-hexane mixture.

In preparing the compounds employed in the present invention by Reaction 1 as phenols there can be employed 2,4,5 - trichloro-6-nitrophenol, 2,6-dichloro-4-nitrophenol, 2,4-dichloro-6-nitrophenol, 4-chloro-2,6-dinitrophenol, 2-chloro-4-nitrophenol, 3-chloro-4-nitrophenol, 4-chloro-2-nitrophenol, 4-chloro-3-methyl-2-nitrophenol, 2,4,6 - trichlro-3-nitrophenol, 2,5-di-chloro-4-nitrophenol, 2,3-dichloro-6-nitrophenol, 2-chloro-5-nitrophenol, 4-chloro-2-methyl-6-nitrophenol, 4-chloro-2,3-dimethyl-6-nitrophenol and 2-chloro-3,5-dinitrophenol.

As isocyanates which can be employed in Reaction 1 there can be used phenyl isocyanate, o-tolyl isocyanate, m-tolyl isocyanate, p-tolyl isocyanate, o-chlorophenyl isocyanate, m-chlorophenyl isocyanate, p-chlorophenyl isocyanate, 2,4-dichlorophenyl isocyanate, 2,4,6-trichlorophenyl isocyanate, 2,4,5-trichlorophenyl isocyanate, 2,6-dichlorophenyl isocyanate, 2,5-dichlorophenyl isocyanate, 3,4-dichlorophenyl isocyanate, 2,3,4-trichlorophenyl isocyanate.

Typical examples of carbamates which have been prepared by Reaction 1 and their melting points and yields are set forth in Table 1.

TABLE 1

| Compound | M.P., °C. | Yield, Percent |
|---|---|---|
| 2,4,5-trichloro-6-nitrophenyl N-phenyl carbamate | 104–106 | 63 |
| 2,4,5-trichloro-6-nitrophenyl N-o-chlorophenyl carbamate | 130–131 | 37 |
| 2,4,5-trichloro-6-nitrophenyl N-m-chlorophenyl carbamate | 142–144 | 60 |
| 2,4,5-trichloro-6-nitrophenyl N-p-chlorophenyl carbamate | 139–141 | 66 |
| 2,4,5-trichloro-6-nitrophenyl N-o-tolyl carbamate | 157–159 | 36 |
| 2,4,5-trichloro-6-nitrophenyl N-m-tolyl carbamate | 150–154 | 25 |
| 2,6-dichloro-4-nitrophenyl N-p-chlorophenyl carbamate | 149–152 | 71 |
| 2,4-dichloro-6-nitrophenyl N-phenyl carbamate | 100–103 | 49 |
| 2,4-dichloro-6-nitrophenyl N-o-chlorophenyl carbamate | 116–118 | 56 |
| 2,4-dichloro-6-nitrophenyl N-m-chlorophenyl carbamate | 118–120 | 47 |
| 2,4-dichloro-6-nitrophenyl N-p-chlorophenyl carbamate | 118–119 | 52 |
| 2,4-dichloro-6-nitrophenyl N-o-tolyl carbamate | 110–112 | 26 |
| 2,4-dichloro-6-nitrophenyl N-m-tolyl carbamate | 112–115 | 44 |
| 4-chloro-2,6-dinitrophenyl N-p-chlorophenyl carbamate | 97–99 | 97 |
| 2-chloro-4-nitrophenyl N-p-chlorophenyl carbamate | 140–142 | 100 |
| 3-chloro-4-nitrophenyl N-p-chlorophenyl carbamate | 155–156 | 100 |
| 4-chloro-2-nitrophenyl N-p-chlorophenyl carbamate | 166–168 | 97 |
| 4-chloro-3-methyl-2-nitrophenyl N-p-chlorophenyl carbamate | 160–162 | 100 |

Other carbamates within the present invention include 2,4,6 - trichloro - 3 - nitrophenyl N-o-chloro-phenyl carbamate, 2,4,6-trichloro-3-nitrophenyl N-phenyl carbamate, 2,5-dichloro-4-nitrophenyl N-phenyl carbamate, 2,4,5-trichloro - 6 - nitrophenyl N-2,4-dichloro-phenyl carbamate, 2,4,5-trichloro-6-nitrophenyl N-2,4,6-trichlorophenyl carbamate, 4-chloro-3-methyl-2-nitrophenyl N-2,4,5-trichlorophenyl carbamate, 4-chloro-3-methyl-2-nitrophenyl N-phenyl carbamate, 2-chloro-3-methyl-4-nitrophenyl N-p-tolyl carbamate.

There can also be made N,N disubstituted carbamates. These latter type compounds are prepared by the method of Lambrech replacing the secondary aliphatic amines by secondary aromatic amines such as N-methyl aniline, diphenyl amine, di-p-chlorophenyl amine, di-o-chlorophenyl amine, di-p-chlorophenyl amine, di-m-chlorophenyl amine, di-(2,4-dichlorophenyl) amine, di-(2,4,6-trichlorophenyl) amine, di-p-toyl amine, di-m-tolyl amine and di-o-toly amine.

Examples of carbamates prepared by this latter procedure are 4-chloro-2-nitrophenyl N,N-diphenyl carbamate, 2,4,5 - trichloro - 6 - nitrophenyl N,N-diphenyl carbamate, 2,4,5-trichloro-6-nitrophenyl N,N-di-p-chlorophenyl carbamate, 2,4,5-trichloro-6-nitrophenyl N,N-di-o-tolyl carbamate, 2,4,5-trichloro-6-nitrophenyl N-methyl, N,-phenyl carbamate, 2,4,5 - trichloro - 6-nitrophenyl N,N-di-(2,4,6-trichlorophenyl) carbamate, 2,4,5-trichloro-6-nitrophenyl N,N-di-(2,4-dichlorophenyl) carbamate.

Compounds within the present invention had noticeably enhanced desiccant activity as compared to similar compounds which did not have at least one nitro group.

In one test at 4 lbs. of active ingredient per acre the defoliation and desiccation of cotton plants two weeks after application was as set forth in Table 2.

TABLE 2

| Compound | Percent Defoliation | Percent Desiccation |
|---|---|---|
| 2,4-dichloro-6-nitrophenyl N-p-chlorophenyl carbamate | 100 | 100 |
| 2,4-dichloro-6-nitrophenyl N-o-chlorophenyl carbamate | 70 | 70 |
| 2,4,5-trichloro-6-nitrophenyl N-o-chlorophenyl carbamate | 100 | 100 |
| 2,4,5-trichloro-6-nitrophenyl N-m-chlorophenyl carbamate | 100 | 100 |
| 2,4,5-trichloro-6-nitrophenyl N-p-chlorophenyl carbamate | 100 | 100 |

As a rule at the end of one week after application, desiccation was 70 to 100% complete while defoliation was 0 to 70% complete.

When the compounds of the present invention were listed as saprophytic nematocides against Panagrellus spp., and Rhabditis spp., at a rate of 200 p.p.m., there was obtained the percent kill set forth in Table 3.

TABLE 3

| Compound | Percent kill |
|---|---|
| 2,4,5 - trichloro - 6 - nitrophenyl p-chlorophenyl carbamate | 50 |
| 2,4,5-trichloro-6-nitrophenyl o-tolyl carbamate | 30 |
| 2,4,5 - trichloro - 6 - nitrophenyl m - tolyl carbamate | 30 |
| 2,4-dichloro-6-nitrophenyl o-chlorophenyl carbamate | 100 |
| 2,4-dichloro-6-nitrophenyl m-chlorophenyl carbamate | 30 |
| 2,4-dichloro-6-nitrophenyl p-chlorophenyl carbamate | 100 |

The last compound in Table 3 was still 100% effective at a rate of 100 p.p.m.

The compounds of the present invention also showed fungicidal activity in several tests. Thus at a rate of 1000 p.p.m., the following compounds prevented spore germination of Alternaria spp.

2,4,5-trichloro-6-nitrophenyl-N-o-chlorophenyl carbamate;
2,4,5-trichloro-6-nitrophenyl-N-m-chlorophenyl carbamate;
2,4,5-trichloro-6-nitrophenyl-N-p-chlorophenyl carbamate;
2,4-dichloro-6-nitrophenyl-N-o-chlorophenyl carbamate;
2,4-dichloro-6-nitrophenyl-N-m-chlorophenyl carbamate;
2,4-dichloro-6-nitrophenyl-N-p-chlorophenyl carbamate;

Several of the compounds still showed slight inhibition of the spore germination at a rate as low as 10 p.p.m.

In agar plate fungicide tests, the results are set forth in Table 4. In the table, 0 indicates no inhibition and 10 indicates complete inhibition of fungi growth, X, Y and R are as set forth in Formula I. The fungi are abbreviated in the following manner:

P is *Pythium irregulare*
C is *Colletotrichum obiculare von Arx*
F is *fusarium lycopersici*
H is *Helminthosporium sativum*
R is *Rhizoctonia solani*
V is *Verticillium albo-atrum*

TABLE 4

| X | Y | R | Rate (p.p.m.) | P | C | F | H | R | V |
|---|---|---|---|---|---|---|---|---|---|
| 2,4,5-trichloro- | 6-nitro- | o-Chlorophenyl | 1,000 | 10 | | 10 | 10 | 10 | |
| | | | 100 | 10 | | 0 | 0 | 0 | |
| 2,4,5-trichloro- | 6-nitro- | m-Chlorophenyl | 1,000 | 10 | | 10 | 10 | 10 | |
| | | | 100 | 10 | | 0 | 0 | 0 | |
| 2,4,5-trichloro- | 6-nitro- | p-Chlorophenyl | 1,000 | 10 | | 10 | 10 | 10 | |
| | | | 100 | 10 | | 0 | 0 | 0 | |
| 2,4,5-trichloro- | 6-nitro- | o-Tolyl | 500 | | 8 | 8 | 8 | 10 | 8 |
| | | | 100 | | 8 | 5 | 8 | 8 | 5 |
| | | | 10 | | 5 | 2 | 5 | 5 | 0 |
| 2,4,5-trichloro- | 6-nitro- | m-Tolyl | 500 | | 8 | 8 | 8 | 10 | 8 |
| | | | 100 | | 8 | 5 | 8 | 8 | 5 |
| | | | 10 | | 5 | 0 | 5 | 8 | 0 |
| 2,4-dichloro- | 6-nitro- | o-Chlorophenyl | 1,000 | 10 | | 10 | 10 | 10 | |
| | | | 100 | 10 | | 10 | 10 | 10 | |
| | | | 10 | 10 | | 10 | 10 | 10 | |
| 2,4-dichloro- | 6-nitro- | m-Chlorophenyl | 1,000 | 10 | | 10 | 10 | 10 | |
| | | | 100 | 10 | | 10 | 10 | 10 | |
| | | | 10 | 10 | | 10 | 10 | 10 | |
| 2,4-dichloro- | 6-nitro- | p-Chlorophenyl | 1,000 | 10 | | 10 | 10 | 10 | |
| | | | 100 | 10 | | 10 | 10 | 10 | |
| | | | 10 | 10 | | 10 | 10 | 10 | |

The compounds were also tested as soil fungicides and all of the compounds set forth in Table 4 above showed fungicidal activity against Pythium spp, at a dosage of 50 lbs./acre by permitting pea seeds planted in the soil to germinate.

What is claimed is:

1. A compound having the formula

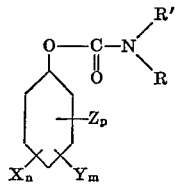

where X is chlorine, Y is nitro, Z is selected from the group consisting of methyl and hydrogen, R is selected from the group consisting of phenyl, tolyl and chlorophenyl and R' is selected from the group consisting of hydrogen, phenyl, tolyl, chlorophenyl, methyl, $n$ and $m$ are integers from 1 to 3 and $p$ is an integer from 0 to 3.

2. A compound according to claim 1 in which R' is hydrogen.

3. A compound according to claim 1 wherein $n$ is 1 to 3, $m$ is 1 to 2, R is selected from the group consisting of phenyl and tolyl and Z is hydrogen.

4. A compound according to claim 3 wherein $n$ is 2 and $m$ is 1.

5. A compound according to claim 3 wherein $n$ is 3 and $m$ is 1.

6. A compound according to claim 1 wherein $n$ is 1 to 3, $m$ is 1 to 2, R is chlorophenyl having 1 to 3 chlorine atoms and Z is hydrogen.

7. A compound according to claim 6 wherein $n$ is 2 and $m$ is 1.

8. A compound according to claim 1 wherein $n$ is 1, $m$ is 2, R is phenyl, R' is mono chlorophenyl and Z is hydrogen.

9. A compound according to claim 1 wherein $n$ is 3, $m$ is 1 and R is chlorophenyl and Z is hydrogen.

10. A compound according to claim 1 wherein $n$ is 1, $m$ is 1, R' is mono chlorophenyl and Z is methyl.

References Cited

UNITED STATES PATENTS

| | | | |
|---|---|---|---|
| Re. 24,868 | 9/1960 | Beaver et al. | 260—471 |
| 2,933,383 | 4/1960 | Lambrech | 260—471 |
| 2,945,877 | 7/1960 | Zima et al. | 260—471 |

LORRAINE A. WEINBERGER, *Primary Examiner.*

L. A. THAXTON, *Assistant Examiner.*

U.S. Cl. X.R.

71—70; 424—309